Feb. 22, 1966      D. B. McILVIN      3,235,909
INJECTION MOLDING MACHINE
Filed May 1, 1963      3 Sheets-Sheet 1
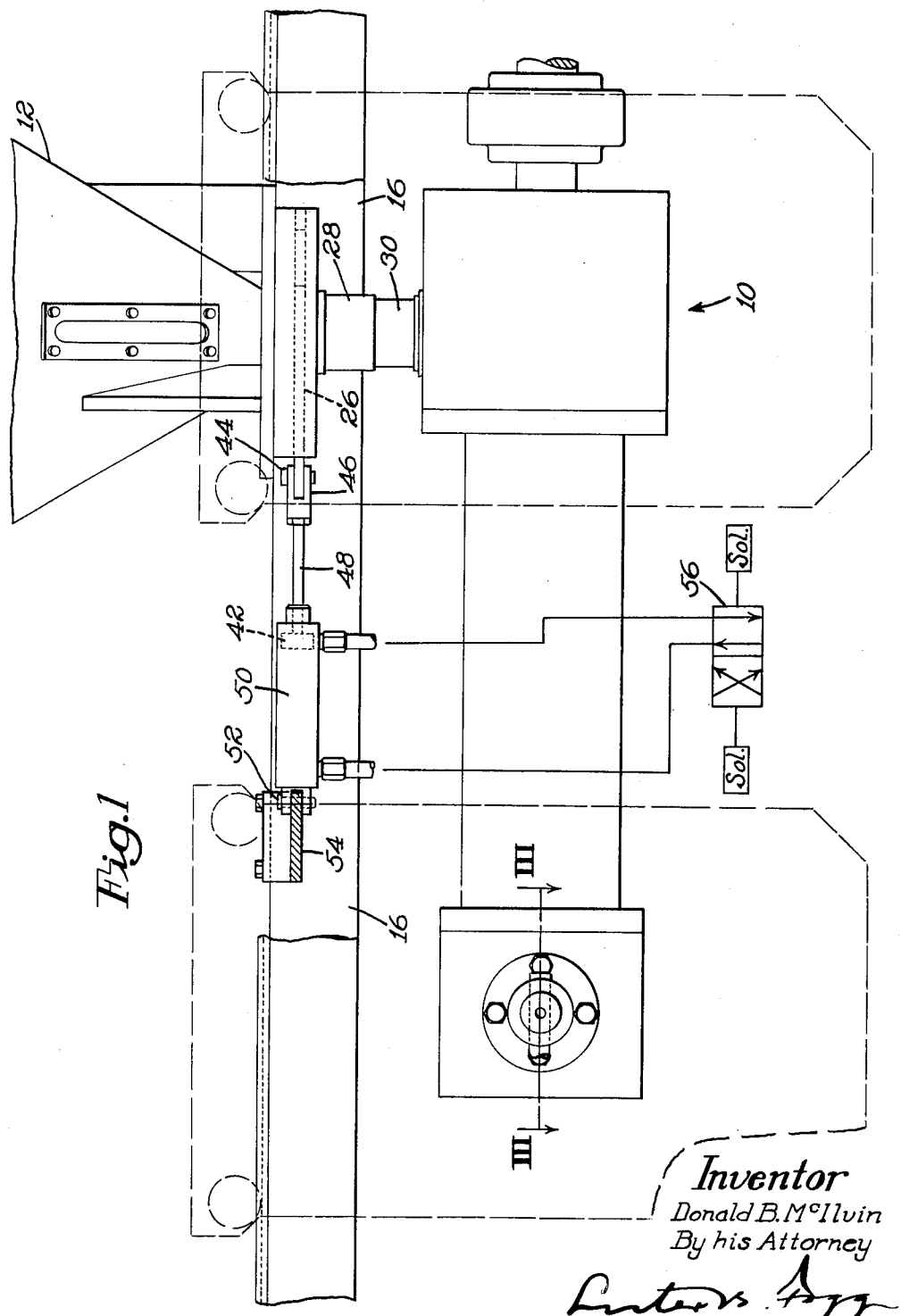
Inventor
Donald B. McIlvin
By his Attorney

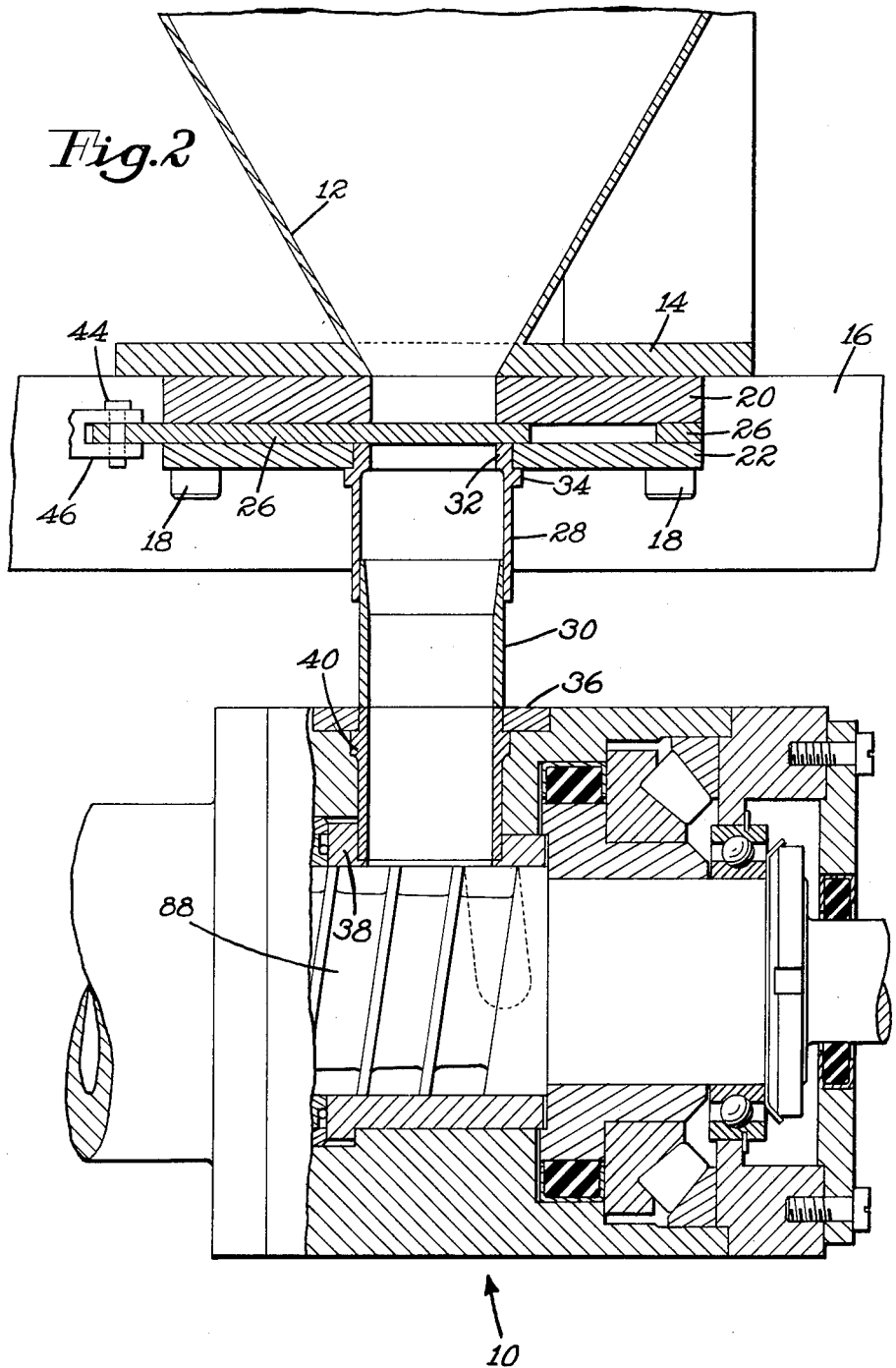

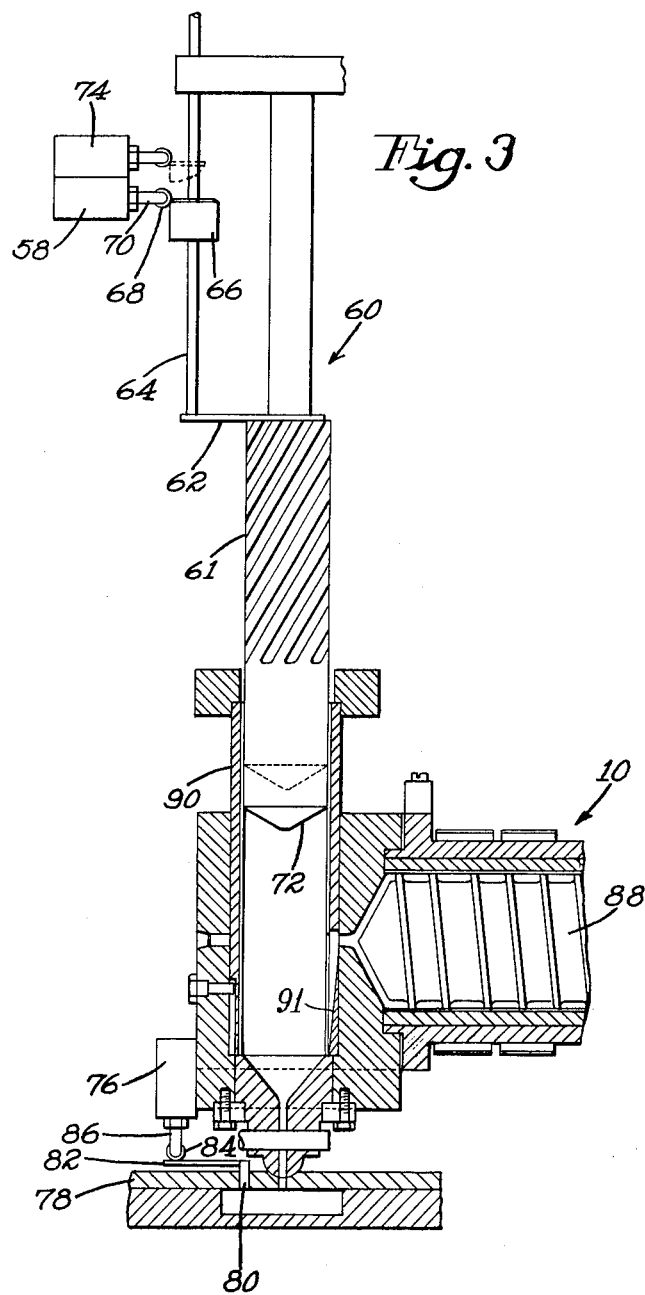

United States Patent Office 3,235,909
Patented Feb. 22, 1966

3,235,909
INJECTION MOLDING MACHINE
Donald B. McIlvin, Danvers, Mass., assignor to United Shoe Machinery Corporation, Boston, Mass., a corporation of New Jersey
Filed May 1, 1963, Ser. No. 277,203
4 Claims. (Cl. 18—30)

This invention relates to injection molding machines and is herein illustrated in its application to machines for injecting shoe soles or sole and heel units in situ onto shoe bottoms. A machine of this type is disclosed, for example, in United States Letters Patent No. 3,006,032, granted October 31, 1961, on an application filed in the names of Willard L. Baker et al.

The Baker et al. patent discloses an injection molding machine having a mold charging ram operating in a ram cylinder and a plasticator in the form of a rotary screw which operates to charge the ram cylinder and to move the ram into its retracted position preparatory to a mold charging operation. In the Baker et al. machine the plasticator is supplied by plastic in tape form fed from a reel.

In is an object of the present invention to provide, as an alternative plasticator supply means, a hopper for feeding comminuted or pelletized plastic material to the plasticator cylinder. It has been found desirable in hopper fed machines of this type to obviate the storage of plastic material in close proximity to the plasticator for extended periods of time since the heat in the plasticator is sufficient to cause melting of plastic materials stored in close proximity thereto and, after the plasticator is cooled, solidification of the molten material into a mass that must be removed before operation of the machine is resumed. It is a further object of the invention to provide a hopper organization wherein the presence of plastic material in close proximity to the plasticator for extended periods is obviated.

With these objects in view, the present invention in one aspect thereof contemplates the provision in an injection molding machine of the type above described of a hopper for supplying plastic material to the plasticator, a conduit separating the hopper from the plasticator and providing a passage through which plastic material flows from the hopper to the plasticator and a gate valve between the hopper and the conduit. In order to insure substantially complete exhausion of plastic material from the conduit in each cycle of the machine, means is provided for operating the gate valve at a predetermined point in the retraction of the mold charging ram such that substantially all of the plastic material in the conduit flows from the conduit into the plasticator during that portion of the retracting movement of the ram following the closing of the gate valve. A suitable piston and cylinder assembly is provided for operating the gate valve and a control valve is provided for causing the operation of the gate valve at the appointed time in the machine cycle. For operating the control valve an electric switch is mounted adjacent to the mold charging ram and the ram during its retraction causes the operation of the switch thereby to effect the closing of the gate valve at the appointed time.

The invention will now be described with reference to the accompanying drawings and pointed out in the appended claims.

In the drawings.

FIG. 1 is a front elevation, partly diagrammatic, illustrating portions of a machine embodying the features of the present invention;

FIG. 2 is an enlarged view of a portion of the showing of FIG. 1, largely in section on the vertical axis of the hopper; and FIG. 3 is a section on the line III–III of FIG. 1.

The invention is illustrated as embodied in a machine of the type disclosed in the Baker et al. Patent No. 3,006,032 hereinbefore referred to. Machines of this type comprise a plurality of ambulatory assemblies each having a shoe form for mounting a lasted shoe, and mold elements wherein shoe soles or sole and heel units are molded in situ onto the bottom of the lasted shoe. Suitable conveyor mechanism advances the ambulatory assemblies seriatim from a loading station to a mold charging or injection station and thence through a series of idle stations back to the loading station where the shoe with a sole newly molded thereon is removed from the shoe form and replaced by a lasted shoe onto which a sole is to be molded. For charging the mold cavity machines of this type are equipped with a plasticator wherein a solid plastic material is reduced to a fluid state and transmitted to a cylinder wherein a ram operates to advance the fluid plastic forcibly through an injection nozzle and into the mold cavity.

The machine of the present invention has a plasticator which is identified generally by the numeral 10. The illustrated plasticator is supplied by a hopper 12 which is designed to receive either pelletized or comminuted material. Referring to FIG. 2 the illustrated hopper is formed integrally with a base plate 14 which is supported upon frame elements including a rail 16. Secured to the base plate 14 by headed screws 18 is a gate valve assembly comprising a plate 20 arranged in contiguous relation to the bottom surface of the base plate 14, a lower plate 22 separated from the plate 20 by spacer members (not shown) and a valve element herein illustrated as a plate 26 slidably mounted between the plates 20 and 22. The plate 20 and the valve plate 26 have formed therein apertures corresponding in diameter to the opening at the base of the hopper. Between the valve assembly and the plasticator there is a conduit comprising an upper tube 28 and a lower tube 30 constructed and arranged to telescope into the upper tube. The tube 28 has at its upper extremity a rim 32 which is fixed within an aperture in the plate 22 and a flange 34 adjacent to the rim 32 is seated against the bottom surface of the plate 22. The lower tube 30 is mounted in an annular member 36 incorporated in the plasticator and is seated in a counterbore formed in an inner tubular member 38 of the plasticator. A peripheral flange 40 formed in the central portion of the lower tube 30 bears against the lower surface of the annular member 36 and prevents upward displacement of the tube.

For operating the gate valve a double acting piston 42 (FIG. 1) is connected to the valve plate 26 by a headed pin 44 (FIG. 2) extending through a bifurcated member 46 fixed to the piston rod 48 and through an aperture in the left end portion of the valve plate. The piston 42 operates in a cylinder 50 which is connected by a bolt 52 to a bracket 54 secured to the rail 16. For controlling the operation of the piston 42 there is provided a four-way valve 56 of the type which is operated in each direction by a solenoid. For operating the valve 56 to cause the gate valve to be closed there is provided a microswitch 58 (FIG. 3) which is operated by a mold-charging ram 60 in the course of its retracting movement. To this end the ram carries at the rear end of its head 61 a plate 62 extending to the left from the ram and having mounted in its left end portion a stem 64 which extends rearwardly from the head 61 and carries a tubular member 66 constructed and arranged to engage a roll 68 mounted in the end of a stem 70 projecting from the casing of the microswitch. After the closing of the gate valve the retraction of the ram continues until its conical forward end portion 72 reaches the position indicated by broken lines in FIG. 3 where the retraction of the ram is terminated by the operation of a second microswitch 74 by the tubular member 66. The opening of the gate valve is effected by the operation of a microswitch 76 upon the completion of the charging of the mold cavity. To this end there is provided in a mold carrier plate 78 a plunger 80 which is actuated by the pressure of fluid plastic in the mold cavity so as to cause an arm 82 carried by the plunger to bear against a roll 84 carried by a stem 86 of the microswitch assembly and to move the stem rearwardly to operate the switch.

In the operation of the illustrated machine the conveyor is indexed to advance an ambulatory assembly into the mold charging station and the arrival of the assembly in said station causes the advancement of the ram 60. Upon the completion of the mold charging operation the pressure of fluid plastic in the mold cavity actuates the plunger 80 thereby to operate the microswitch 76 which causes the advancement of the ram to terminate, and also causes the operation of the four-way valve 56 thereby to open the gate valve and thus to cause the flow of material from the hopper 12 through the conduit 28, 30 into the plasticator. Concomitantly with the arresting of the ram and the operation of the gate valve the operation of the plasticator screw 88 is initiated. The plasticator forces fluid plastic into the forward portion of the ram cylinder 90 and thus causes the retraction of the ram 60. To provide a channel for such flow of the fluid plastic, the interior of the ram cylinder 90 is provided in its forward portion with a tapered groove 91 as indicated in FIG. 3. In the course of the retracting movement of the ram the tubular member 66 carried by the ram operates the microswitch 58 to effect the closing of the gate valve. The retraction of the ram continues after the gate valve has closed until the tubular member 66 operates the microswitch 74 to terminate the operation of the plasticator screw and thus to arrest the retraction of the ram 60. The microswitch 58 is so positioned with relation to the microswitch 74 that the period of operation of the plasticator screw following the closing of the gate valve is of sufficient duration to cause substantially all of the plastic material in the conduit 28, 30 to be exhausted therefrom. If desired the microswitch 58 may be so adjusted lengthwise of the ram stroke that upon the completion of the operation of the plasticator screw there will remain in the lower portion of the conduit an increment of plastic material sufficient to prevent the passage of air from the conduit into the plasticator. Upon the completion of the retraction of the ram 60 the machine is set for a repetition of the cycle of operations above described.

Having thus described my invention, what I claim as new and desire to secure by Letters Patent of the United States is:

1. In an injection molding machine, the combination with a mold charging ram, a ram cylinder and a plasticator which operates to charge the ram cylinder and to move the ram into its retracted position preparatory to a mold charging operation, of a hopper for supplying plastic material to the plasticator, a conduit through which plastic material flows from the hopper to the plasticator, a gate valve between the hopper and the conduit, a piston and cylinder assembly for operating the gate valve, a control valve for causing the operation of the piston and cylinder assembly and means operated by the mold charging ram during its retraction for causing shifting of the control valve whereby to effect the closing of the gate valve.

2. In an injection molding machine, the combination with a mold charging ram, a ram cylinder and a plasticator which operates to charge the ram cylinder and to move the ram into its retracted position preparatory to a mold charging operation, of a hopper for supplying plastic material to the plasticator, a conduit through which plastic material flows from the hopper to the plasticator, a gate valve between the hopper and the conduit, a piston and cylinder assembly for operating the gate valve, a control valve for the piston and cylinder assembly, an electric switch for causing the operation of the control valve thereby to cause the closing of the gate valve, and means operating at a predetermined point in the retraction of the mold charging ram for causing the operation of the switch.

3. In an injection molding machine, the combination with a mold charging ram, a ram cylinder and a plasticator which operates to charge the ram cylinder and to move the ram into its retracted position preparatory to a mold charging operation, of a hopper for supplying plastic material to the plasticator, a conduit through which plastic material flows from the hopper to the plasticator, a gate valve between the hopper and the conduit, means for operating the gate valve, a switch for causing said operating means to close the gate valve, and means carried by the mold charging ram and operable at a predetermined point in its retracting movement for operating the switch thereby causing the closure of the gate valve at a point in the retracting movement of the ram such that the plasticator will substantially completely exhaust the conduit during the remainder of the retracting movement of the ram following the closing of the gate valve.

4. In an injection molding machine, the combination with a mold charging ram, a ram cylinder, a plasticator screw and a plasticator cylinder of a hopper for supplying plastic material to the plasticator screw, a base plate incorporated in the hopper, a frame section to which the base plate is secured, a gate valve assembly secured to the base plate, a conduit through which plastic material flows from the hopper to the plasticator, said conduit comprising a first tube mounted in the gate valve assembly and a second tube mounted in the plasticator cylinder, said first tube and second tube having mutual telescopic engagement, a piston and cylinder assembly for operating the gate valve, a control valve for causing the operation of the piston and cylinder assembly and means operated by the mold charging ram during its retraction for causing shifting of the control valve whereby to effect the closing of the gate valve.

References Cited by the Examiner

UNITED STATES PATENTS

| | | | |
|---|---|---|---|
| 2,439,966 | 4/1948 | Dinzl | 18—30 |
| 2,831,214 | 4/1958 | Eyles et al. | 18—30 |
| 3,002,229 | 10/1961 | Friederick | 18—30 |

J. SPENCER OVERHOLSER, *Primary Examiner*,

MICHAEL V. BRINDISI, *Examiner*.